US012649316B2

(12) United States Patent
Takabe

(10) Patent No.: US 12,649,316 B2
(45) Date of Patent: Jun. 9, 2026

(54) LIQUID EJECTING HEAD AND LIQUID EJECTING APPARATUS

(71) Applicant: SEIKO EPSON CORPORATION, Tokyo (JP)

(72) Inventor: Motoki Takabe, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 224 days.

(21) Appl. No.: 18/363,094

(22) Filed: Aug. 1, 2023

(65) Prior Publication Data

US 2024/0042770 A1 Feb. 8, 2024

(30) Foreign Application Priority Data

Aug. 4, 2022 (JP) ................................. 2022-124599

(51) Int. Cl.
*B41J 2/175* (2006.01)
*B41J 2/14* (2006.01)

(52) U.S. Cl.
CPC ....... *B41J 2/17563* (2013.01); *B41J 2/14233* (2013.01); *B41J 2002/14403* (2013.01); *B41J 2002/14419* (2013.01); *B41J 2202/12* (2013.01)

(58) Field of Classification Search
CPC ................ B41J 2/17563; B41J 2/14233; B41J 2002/14403; B41J 2002/14419; B41J 2202/12
See application file for complete search history.

(56) References Cited

U.S. PATENT DOCUMENTS 6,669,336 B1 * 12/2003 Kneezel ............... B41J 2/17563 347/65
2018/0072066 A1 3/2018 Yoneta

FOREIGN PATENT DOCUMENTS

JP 2018-047683 A 3/2018

* cited by examiner

*Primary Examiner* — Geoffrey S Mruk

(74) *Attorney, Agent, or Firm* — WORKMAN NYDEGGER

(57) ABSTRACT

A liquid ejecting head includes a plurality of individual flow passages and a first common flow passage. The plurality of individual flow passages is provided correspondingly to a plurality of nozzles from which a liquid is ejected. The first common flow passage is in shared communication with the plurality of individual flow passages and supplies a liquid to the plurality of individual flow passages. A filter is provided in the first common flow passage. The filter is comprised of a plurality of protruding portions protruding from a first wall surface among a plurality of wall surfaces of the first common flow passage. The plurality of protruding portions is not in contact with any of the plurality of wall surfaces of the first common flow passage, except for the first wall surface.

17 Claims, 7 Drawing Sheets

LIQUID EJECTING HEAD AND LIQUID EJECTING APPARATUS

The present application is based on, and claims priority from JP Application Serial Number 2022-124599, Aug. 4, 2022, the disclosure of which is hereby incorporated by reference herein in its entirety.

BACKGROUND

1. Technical Field

Embodiments of the present disclosure relate to a liquid ejecting head and a liquid ejecting apparatus.

2. Related Art

In a liquid ejecting head provided in a liquid ejecting apparatus such as an ink-jet printer and configured to eject a liquid such as ink, a technique for removing an air bubble or the like that is contained in a liquid that is temporarily stored inside the liquid ejecting head by providing a filter on a liquid flow passage inside the liquid ejecting head has been proposed. For example, JP-A-2018-047683 discloses a technique regarding a liquid ejecting head that includes a plurality of individual flow passages provided correspondingly to a plurality of nozzles from which a liquid is ejected, a single supply-side common liquid chamber that is in shared communication with the plurality of individual flow passages and supplies ink to the plurality of individual flow passages, and a filter interposed between the single supply-side common liquid chamber and the plurality of individual flow passages.

However, in related art, there is an issue that the flow-passage resistance of the entire flow passage including the supply-side common liquid chamber and the individual flow passages will be high because the liquid is supplied from the supply-side common liquid chamber to each of the individual flow passages through the filter.

SUMMARY

A liquid ejecting head according to an aspect of the present disclosure includes: a plurality of individual flow passages provided correspondingly to a plurality of nozzles from which a liquid is ejected; and a first common flow passage that is in shared communication with the plurality of individual flow passages and supplies a liquid to the plurality of individual flow passages, wherein a filter comprised of a plurality of protruding portions protruding from a first wall surface among a plurality of wall surfaces of the first common flow passage is provided in the first common flow passage, and the plurality of protruding portions is not in contact with any of the plurality of wall surfaces of the first common flow passage, except for the first wall surface.

A liquid ejecting apparatus according to an aspect of the present disclosure includes: the liquid ejecting head stated above, and a controller that controls liquid ejection from the liquid ejecting head stated above.

DESCRIPTION OF EXEMPLARY EMBODIMENTS

Figure 1:
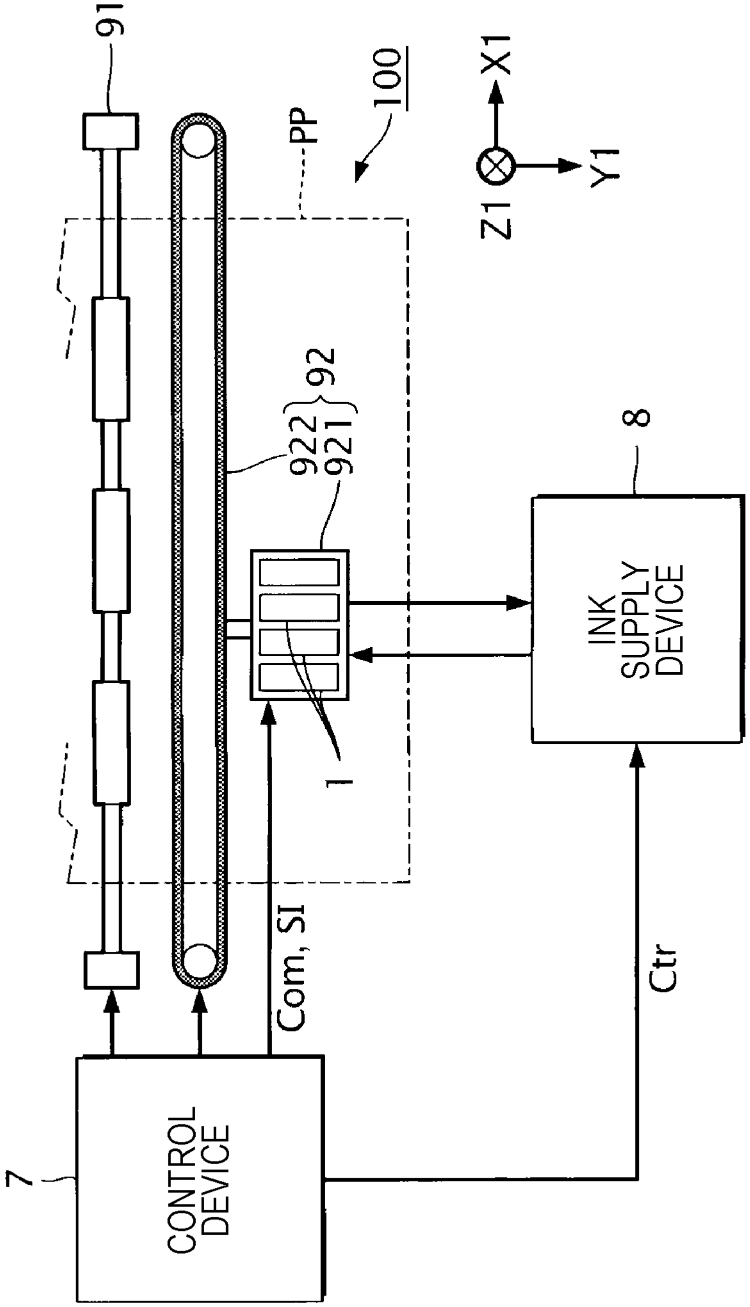
FIG. 1 is a configuration diagram illustrating an example of a liquid ejecting apparatus according to an embodiment of the present disclosure.

With reference to the accompanying drawings, a certain embodiment of the present disclosure will now be explained. In the drawings, however, the dimensions and scales of components may be made different as appropriate from those in actual implementation. Since the embodiment described below shows some preferred examples of the present disclosure, they contain various technically-preferred limitations. However, the scope of the present disclosure shall not be construed to be limited to the examples described below unless and except where the description contains an explicit mention of an intent to limit the present disclosure.

A. EMBODIMENT

A liquid ejecting apparatus 100 according to a present embodiment will now be described.

1. Overview of Liquid Ejecting Apparatus

FIG. 1 is a diagram for explaining the liquid ejecting apparatus 100 according to the present embodiment.

The liquid ejecting apparatus 100 is an ink-jet printing apparatus that ejects ink onto a medium PP. A typical example of the medium PP is printing paper, but not limited thereto. Any target of printing such as a resin film or a cloth can be used as the medium PP. Ink is an example of a "liquid".

As illustrated in FIG. 1, the liquid ejecting apparatus 100 includes a plurality of liquid ejecting heads 1, a control device 7, an ink supply device 8, a moving mechanism 91, and a carriage mechanism 92.

The control device 7 includes, for example, a processing circuit such as a CPU or an FPGA, and a storage circuit such as a semiconductor memory, and controls various elements of the liquid ejecting apparatus 100. CPU is an acronym for Central Processing Unit. FPGA is an acronym for Field Programmable Gate Array.

Under the control of the control device 7, the moving mechanism 91 transports the medium PP in a Y1 direction along a Y axis. In the description below, the Y1 direction along the Y axis, and a Y2 direction, which is the opposite of the Y1 direction, will be collectively referred to as "Y-axis direction". In addition, in the description below, an X1 direction along an X axis, which intersects with the Y axis, and an X2 direction, which is the opposite of the X1 direction, will be collectively referred to as “X-axis direction”. In addition, in the description below, a Z1 direction along a Z axis, which intersects with the X axis and the Y axis, and a Z2 direction, which is the opposite of the Z1 direction, will be collectively referred to as “Z-axis direction”. Moreover, when a scalar product of a vector having a starting point at one object and an ending point at another object and a vector directed in the X1 direction is “positive”, it will be described below that this another object exists on an “X1 side” with respect to this one object. Moreover, when a scalar product of a vector having a starting point at one object and an ending point at another object and a vector directed in the X2 direction is “positive”, it will be described below that this another object exists on an “X2 side” with respect to this one object. The same definition applies to a “Y1 side”, a “Y2 side”, a “Z1 side”, and a “Z2 side”.

In the present embodiment, as an example, a case where the X, Y, and Z axes are orthogonal to one another is assumed. However, the scope of the present disclosure is not limited to this exemplary configuration. It is sufficient as long as the X, Y, and Z axes intersect with one another.

Under the control of the control device 7, the carriage mechanism 92 reciprocates the plurality of liquid ejecting heads 1 in the X1 direction and the X2 direction. The carriage mechanism 92 includes a housing case 921, in which the plurality of liquid ejecting heads 1 is housed, and an endless belt 922, to which the housing case 921 is fixed. Liquid containers 93 may be housed together with the liquid ejecting heads 1 in the housing case 921.

The control device 7 supplies, to the liquid ejecting head 1, a drive signal Com for driving the liquid ejecting head 1 and a control signal SI for controlling the liquid ejecting head 1. Driven by the drive signal Com under the control by the control signal SI, the liquid ejecting head 1 ejects ink in the Z1 direction from some or all of a plurality of nozzles N provided in the liquid ejecting head 1. That is, the liquid ejecting head 1 ejects ink droplets from some or all of the plurality of nozzles N while transporting the medium PP by the moving mechanism 91 and while reciprocating the liquid ejecting head 1 by the carriage mechanism 92 to cause the ejected ink droplets to land onto the surface of the medium PP, thereby forming a print-demanded image on the surface of the medium PP. The nozzles N will be described later with reference to FIGS. 2 and 3.

The ink supply device 8 temporarily stores ink. In addition, based on a control signal Ctr supplied from the control device 7, the ink supply device 8 supplies ink that is temporarily stored in the ink supply device 8 to the liquid ejecting head 1. Moreover, based on a control signal Ctr supplied from the control device 7, the ink supply device 8 collects ink from the liquid ejecting head 1 and returns the collected ink to the liquid ejecting head 1.

In the present embodiment, as an example, it is assumed that the ink supply device 8 temporarily stores four types of ink corresponding to cyan, magenta, yellow, and black. In addition, in the present embodiment, it is assumed that the liquid ejecting head 1 includes four liquid ejecting heads 1 corresponding to four types of ink. However, for a simpler explanation, one type of ink will be described below in a focused manner among the four types of ink that are temporarily stored in the ink supply device 8. Moreover, for a simpler explanation, one liquid ejecting head 1 corresponding to one type of ink will be described below in a focused manner among four liquid ejecting heads 1 included in the liquid ejecting head 1.

2. Overview of Liquid Ejecting Head

Figure 2:
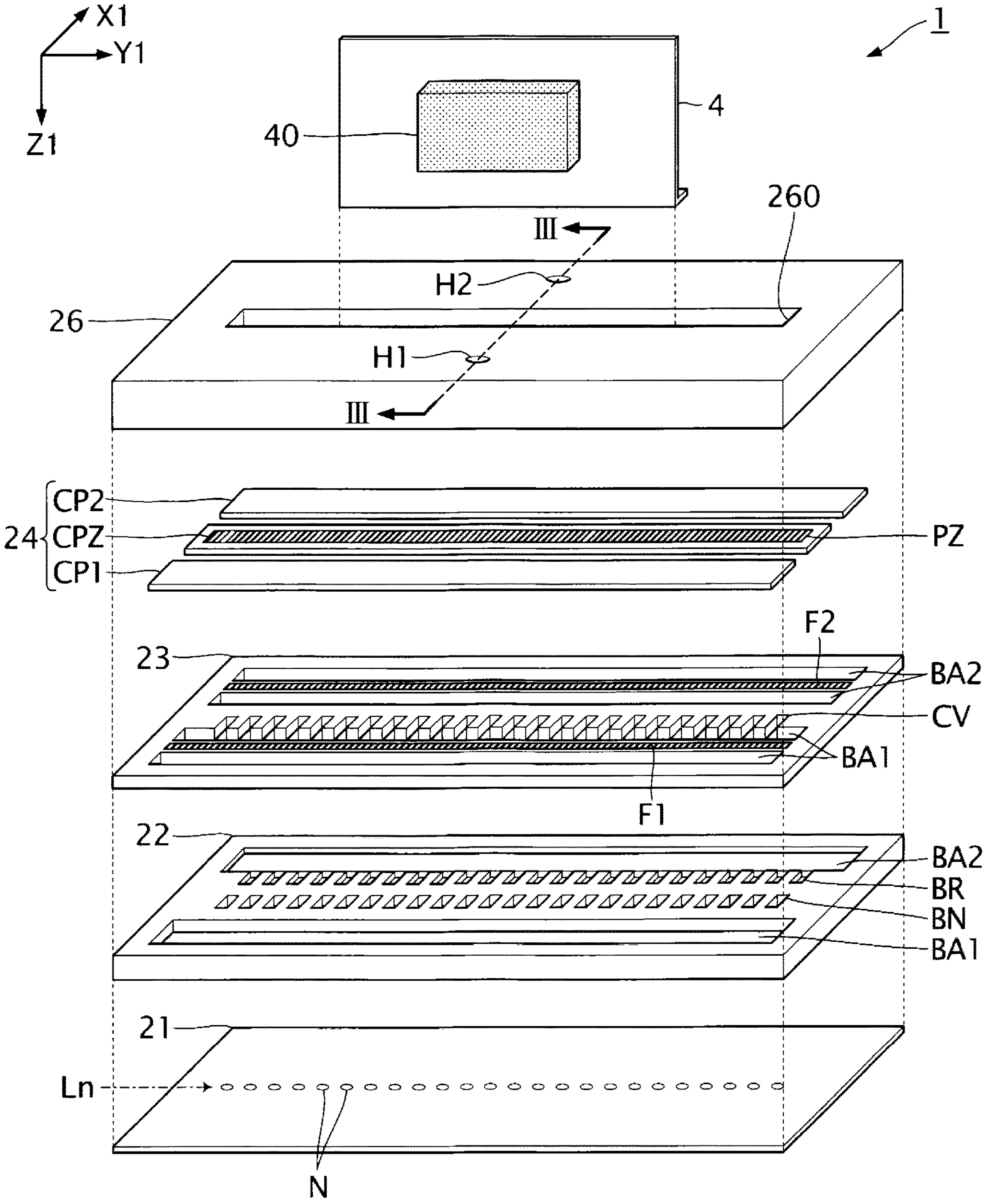
FIG. 2 is an exploded perspective view illustrating an example of the configuration of a liquid ejecting head.
Figure 3:
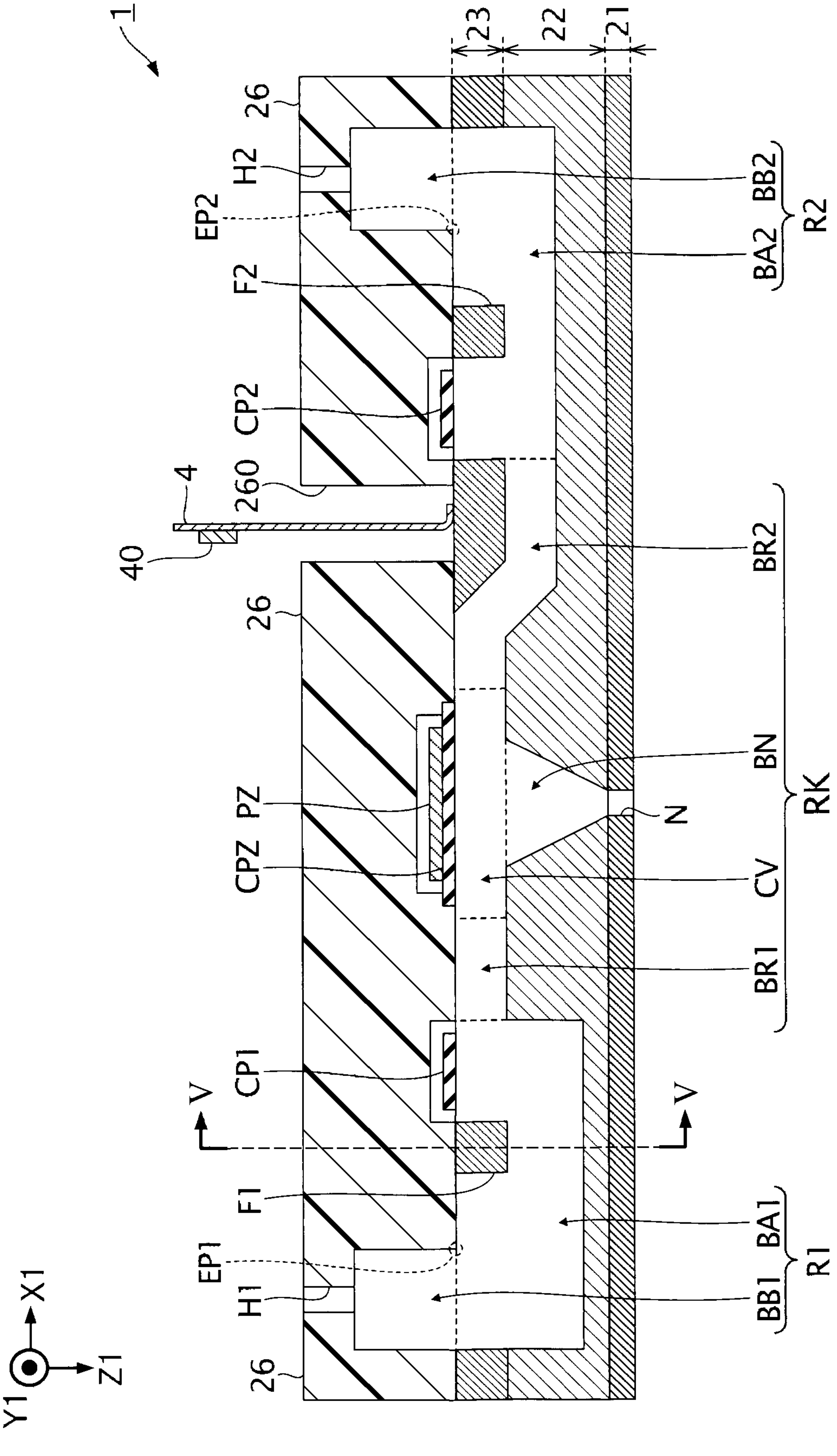
FIG. 3 is a cross-sectional view illustrating an example of the configuration of the liquid ejecting head.

With reference to FIGS. 2 and 3, an overview of the liquid ejecting head 1 is given below.

FIG. 2 is an exploded perspective view of the liquid ejecting head 1. FIG. 3 is a cross-sectional view taken along the line III-III of FIG. 2.

As illustrated in FIGS. 2 and 3, the liquid ejecting head 1 includes a nozzle substrate 21, a communication plate 22, a pressure compartment substrate 23, a diaphragm 24, a flow passage forming substrate 26, and a wiring substrate 4.

As illustrated in FIG. 3, the nozzle substrate 21 is a plate-like member that has longer sides in the Y-axis direction and extends substantially in parallel with an X-Y plane. The concept of “substantially in parallel with” mentioned here includes not only a case of being perfectly in parallel but also a case of being able to be deemed as parallel, with a margin of error taken into consideration. In the present embodiment, the concept of “substantially in parallel with” includes a case of being able to be deemed as parallel, with a margin of error of 10% or so taken into consideration. The nozzle substrate 21 is manufactured by, for example, processing a monocrystalline silicon substrate by using a semiconductor manufacturing technology such as etching. Any known material and method may be used instead for manufacturing the nozzle substrate 21.

The nozzle substrate 21 has M-number of nozzles N. The nozzle N mentioned here is a through hole provided in the nozzle substrate 21. The value M is a natural number that satisfies “M 2”. In the present embodiment, it is assumed that the nozzles N, the number of which is M, are arranged linearly in the Y-axis direction in the nozzle substrate 21. In the description below, the M-number of nozzles N arranged linearly in the Y-axis direction is sometimes referred to as “nozzle row Ln”.

As illustrated in FIGS. 2 and 3, the communication plate 22 is provided at a Z2-side position with respect to the nozzle substrate 21. The communication plate 22 is a plate-like member that has longer sides in the Y-axis direction and extends substantially in parallel with an X-Y plane. The communication plate 22 is manufactured by, for example, processing a monocrystalline silicon substrate by using a semiconductor manufacturing technology. Any known material and method may be used instead for manufacturing the communication plate 22.

As illustrated in FIGS. 2 and 3, the pressure compartment substrate 23 is provided at a Z2-side position with respect to the communication plate 22. The pressure compartment substrate 23 is a plate-like member that has longer sides in the Y-axis direction and extends substantially in parallel with an X-Y plane. The pressure compartment substrate 23 is manufactured by, for example, processing a monocrystalline silicon substrate by using a semiconductor manufacturing technology. Any known material and method may be used instead for manufacturing the pressure compartment substrate 23.

Passages through which ink flows are formed in the communication plate 22 and the pressure compartment substrate 23. Specifically, one common flow passage BA1, which is provided in such a way as to extend in the Y-axis direction, and one common flow passage BA2, which is provided at an X1-side position with respect to the common flow passage BA1 in such a way as to extend in the Y-axis direction, are formed in the communication plate 22 and the pressure compartment substrate 23.

In the pressure compartment substrate 23, M-number of connection flow passages BR1 corresponding to the M-number of nozzles N are formed. In the communication plate 22 and the pressure compartment substrate 23, M-number of connection flow passages BR2 corresponding to the M-number of nozzles N are formed. In the communication plate 22, M-number of nozzle flow passages BN corresponding to the M-number of nozzles N are formed. In the pressure compartment substrate 23, M-number of pressure compartments CV corresponding to the M-number of nozzles N are formed.

Among them, the connection flow passages BR1 are in communication with the common flow passage BA1 and are provided at X1-side positions with respect to the common flow passage BA1 in such a way as to extend in the X-axis direction. The connection flow passages BR2 are in communication with the common flow passage BA2 and are provided at X2-side positions with respect to the common flow passage BA2 in such a way as to extend in the X-axis direction. Each pressure compartment CV communicates the connection flow passage BR1 and the connection flow passage BR2 to each other at a position between the connection flow passage BR1 and the connection flow passage BR2, and is in communication with the nozzle flow passage BN. Each nozzle flow passage BN is provided at a Z1-side position with respect to the pressure compartment CV, is in communication with the pressure compartment CV, and is in communication with the nozzle N.

In the description below, the common flow passage BA1 and the common flow passage BA2 will be sometimes collectively referred to as "common flow passage BA", and the connection flow passage(s) BR1 and the connection flow passage(s) BR2 will be sometimes collectively referred to as "connection flow passage(s) BR". In addition, in the description below, the connection flow passage(s) BR1, the pressure compartment(s) CV that is in communication with the connection flow passage(s) BR1, and the connection flow passage(s) BR2 that is in communication with the pressure compartment(s) CV will be sometimes referred to as "individual flow passage(s) RK". Moreover, in the description below, the individual flow passage RK corresponding to an m-th nozzle N among the M-number of nozzles N will be sometimes referred to as an "individual flow passage RK[m] ". In this definition, the variable number m is a natural number that satisfies "1≤m≤M". In the present embodiment, M-number of individual flow passages RK[1] to RK[M] corresponding to the M-number of nozzles N are arranged in the Y-axis direction. In the present embodiment, the Y1 direction, in which the M-number of individual flow passages RK[1] to RK[M] are arranged, is an example of a "first direction".

A filter F1 and a filter F2 are formed in the pressure compartment substrate 23. The filter F1 is a structural object for catching an air bubble present in ink inside the common flow passage BA1. The filter F2 is a structural object for catching an air bubble present in ink inside the common flow passage BA2. In the description below, the filter F1 and the filter F2 will be sometimes collectively referred to as "filter F".

As illustrated in FIGS. 2 and 3, the diaphragm 24 is provided at a Z2-side position with respect to the pressure compartment substrate 23. The diaphragm 24 includes a vibration plate CPZ, a vibration absorption plate CP1, and a vibration absorption plate CP2. Each of the vibration plate CPZ, the vibration absorption plate CP1, and the vibration absorption plate CP2 is a plate-like member that has longer sides in the Y-axis direction and extends substantially in parallel with an X-Y plane, and is capable of vibrating elastically. Each of the vibration plate CPZ, the vibration absorption plate CP1, and the vibration absorption plate CP2 includes, for example, an elastic film made of silicon oxide and an insulation film made of zirconium oxide. In the present embodiment, the vibration absorption plate CP1 is an example of a "vibration absorber".

The vibration plate CPZ is provided at a Z2-side position with respect to the pressure compartment CV. At Z2-side positions with respect to the vibration plate CPZ, M-number of piezoelectric elements PZ corresponding to the M-number of pressure compartments CV are provided. The piezoelectric element PZ is a passive element that deforms in response to a change in potential of the drive signal Com. Specifically, the piezoelectric element PZ is driven to deform in response to a change in potential of the drive signal Com. The vibration plate CPZ vibrates by being driven by the deformation of the piezoelectric element PZ. The vibration of the vibration plate CPZ causes changes in pressure inside the pressure compartment CV. Then, due to the changes in pressure inside the pressure compartment CV, ink with which the inside of the pressure compartment CV is filled flows through the nozzle flow passage BN and is then ejected from the nozzle N.

The vibration absorption plate CP1 is provided at a Z2-side position with respect to the common flow passage BA1. This position is between the filter F1 and the connection flow passages BR1 in the X-axis direction. When ink flowing inside the common flow passage BA1 vibrates in accordance with changes in pressure inside the pressure compartment CV, the vibration absorption plate CP1 absorbs the vibrations. The vibration absorption plate CP2 is provided at a Z2-side position with respect to the common flow passage BA2. This position is between the filter F2 and the connection flow passages BR2 in the X-axis direction. When ink flowing inside the common flow passage BA2 vibrates in accordance with changes in pressure inside the pressure compartment CV, the vibration absorption plate CP2 absorbs the vibrations. In the description below, the vibration absorption plate CP1 and the vibration absorption plate CP2 will be sometimes collectively referred to as "vibration absorption plate CP".

As illustrated in FIGS. 2 and 3, the flow passage forming substrate 26 is provided at a Z2-side position with respect to the pressure compartment substrate 23. The flow passage forming substrate 26 is a plate-like member that has longer sides in the Y-axis direction and extends substantially in parallel with an X-Y plane. The flow passage forming substrate 26 is formed by, for example, injection molding of a resin material. Any known material and method may be used instead for manufacturing the flow passage forming substrate 26.

Passages through which ink flows are formed in the flow passage forming substrate 26. Specifically, one common flow passage BB1, which is provided in such a way as to extend in the Y-axis direction, and one common flow passage BB2, which is provided in such a way as to extend in the Y-axis direction, are formed in the flow passage forming substrate 26. The common flow passage BB1 is in communication with the common flow passage BA1 and is provided at a Z2-side position with respect to the common flow passage BA1. The common flow passage BB2 is in communication with the common flow passage BA2 and is provided at a Z2-side position with respect to the common flow passage BA2 and at an X1-side position with respect to the common flow passage BB1. In the description below, the common flow passage BB1 and the common flow passage BB2 will be sometimes collectively referred to as "common flow passage BB".

In the description below, the common flow passage BA1 and the common flow passage BB1, which is in communication with the common flow passage BA1, will be sometimes collectively referred to as "common flow passage R1". In addition, in the description below, the common flow passage BA2 and the common flow passage BB2, which is in communication with the common flow passage BA2, will be sometimes collectively referred to as "common flow passage R2". Moreover, in the description below, the common flow passage R1 and the common flow passage R2 will be sometimes collectively referred to as "common flow passage R".

A connection opening H1, which is in communication with the common flow passage BB1, and a connection opening H2, which is in communication with the common flow passage BB2, are provided in the flow passage forming substrate 26. Ink is supplied from the ink supply device 8 to the common flow passage R1, which includes the common flow passage BB1, through the connection opening H1. A part of the ink having been supplied to the common flow passage R1 flows through the connection flow passage BR1 to fill the pressure compartment CV with itself. Then, when the piezoelectric element PZ is driven by the drive signal Com, a part of the ink with which the pressure compartment CV is filled flows through the nozzle flow passage BN to be ejected from the nozzle N. Another part of the ink with which the pressure compartment CV is filled flows through the connection flow passage BR2 to the common flow passage R2. A part of the ink temporarily stored in the common flow passage R2, which includes the common flow passage BB2, is collected to the ink supply device 8 through the connection opening H2.

In the present embodiment, the common flow passage BA1, from which ink is supplied to the individual flow passage RK including the pressure compartment CV, is an example of a "first common flow passage", and the common flow passage BA2, to which ink flows for collection from the individual flow passage RK including the pressure compartment CV, is an example of a "second common flow passage". In the present embodiment, the X1 direction, which is toward the common flow passage BA2 with respect to the common flow passage BA1, is an example of a "second direction". In addition, in the present embodiment, the Z1 direction, which intersects with the X1 direction and the Y1 direction, is an example of a "third direction".

A through hole 260 is provided in the flow passage forming substrate 26. The through hole 260 is a through-hole cavity that is located between the common flow passage BB1 and the common flow passage BB2 when the flow passage forming substrate 26 is viewed in the Z1 direction and goes from the Z1-side surface of the flow passage forming substrate 26 to the Z2-side surface of the flow passage forming substrate 26. The wiring substrate 4 is inserted in the through hole 260.

The diaphragm 24 has two surfaces whose normal-line direction is the Z-axis direction, and, as illustrated in FIGS. 2 and 3, the wiring substrate 4 is mounted on the Z2-side one of these two surfaces. The wiring substrate 4 is a component for electrically coupling the liquid ejecting head 1 to the control device 7. For example, a flexible wiring board such as FPC or FFC can be preferably used as the wiring substrate 4. FPC is an acronym for Flexible Printed Circuit. FFC is an acronym for Flexible Flat Cable. An integrated circuit 40 is mounted on the wiring substrate 4. The integrated circuit 40 is an electric circuit that performs switching as to whether or not to supply the drive signal Com to the piezoelectric element PZ under the control by the control signal SI.

3. Overview of Filter

Figure 4:
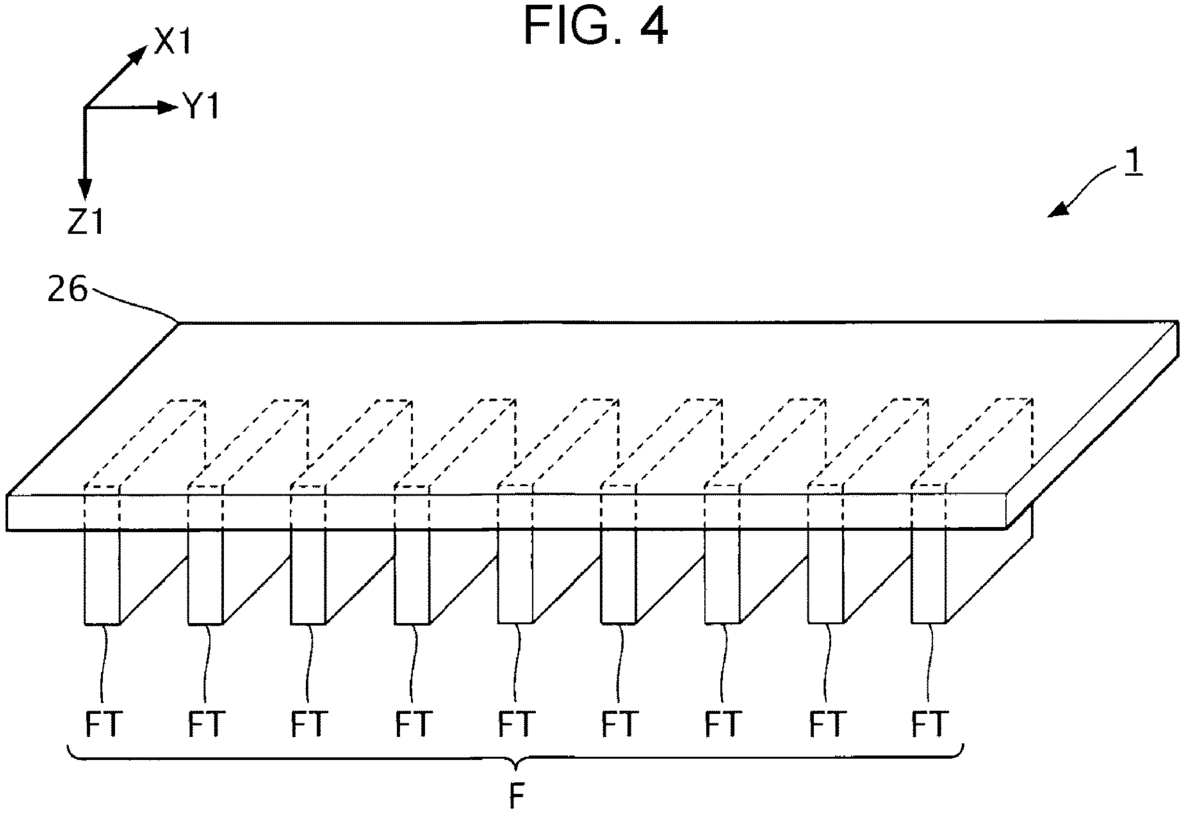
FIG. 4 is a perspective view illustrating an example of the configuration of a flow passage forming substrate and a filter (F).
Figure 5:
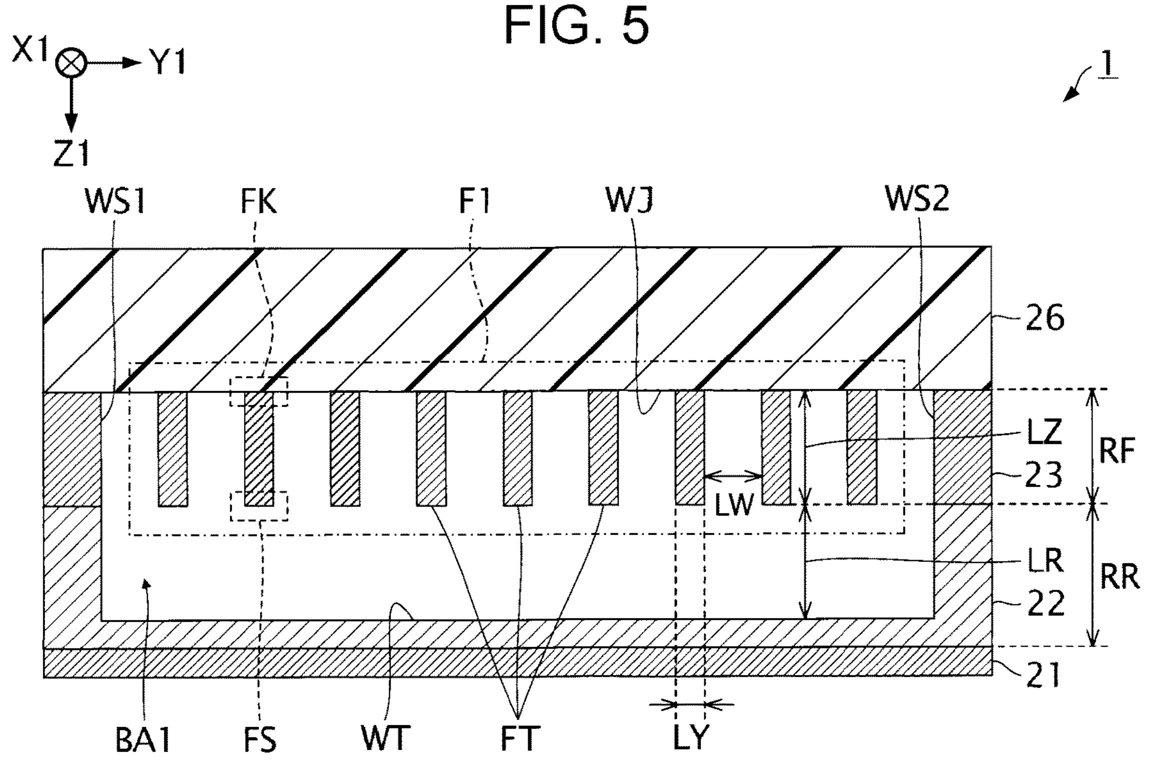
FIG. 5 is a cross-sectional view illustrating an example of the configuration of a common flow passage (BA1) and a filter (F1).
Figure 6:
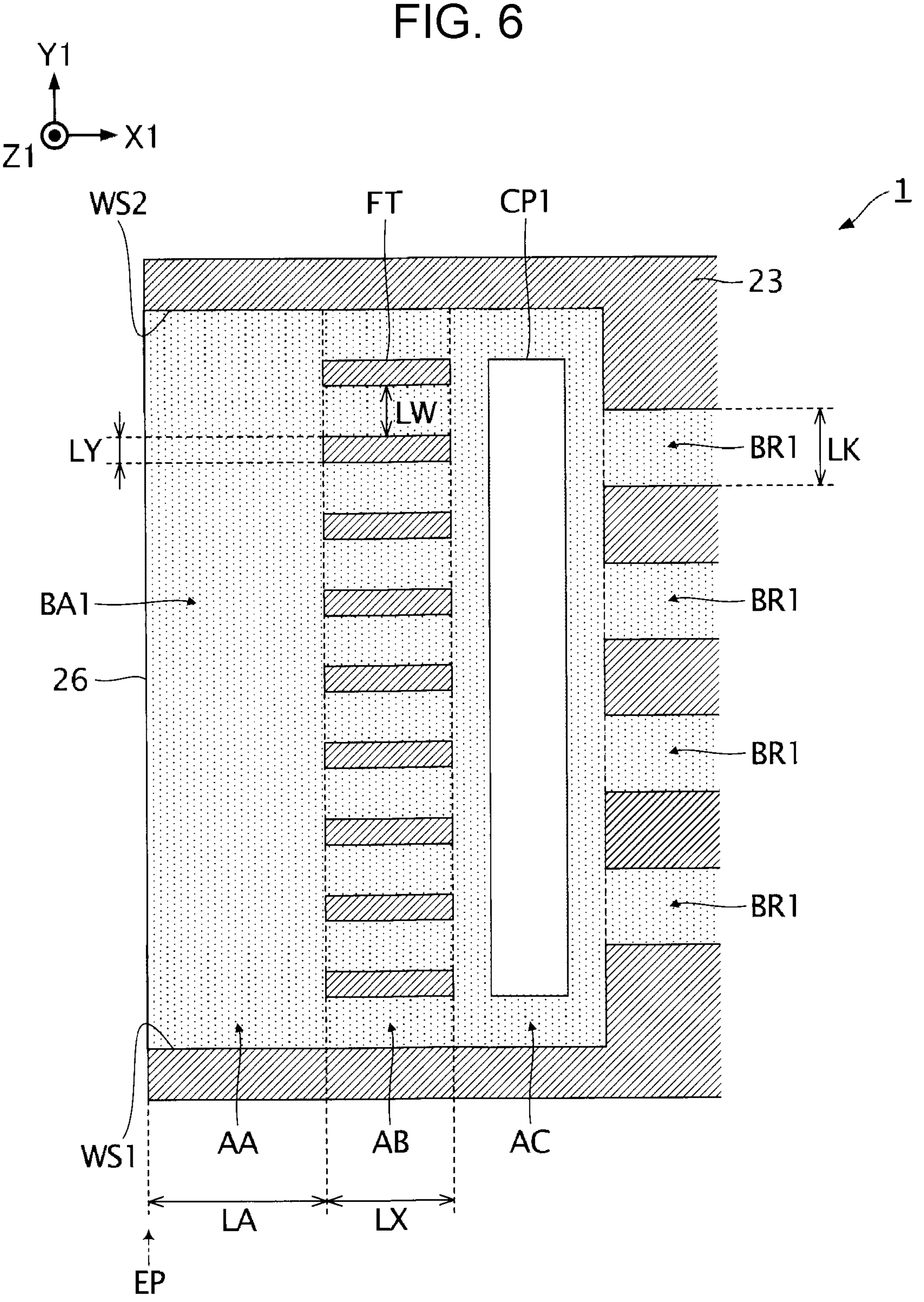
FIG. 6 is a plan view illustrating an example of the configuration of the common flow passage (BA1) and the filter (F1).

With reference to FIGS. 4 to 6, the filter F1 provided in the liquid ejecting head 1 will now be described.

FIG. 4 is a perspective view of the flow passage forming substrate 26 and the filter F1 of the liquid ejecting head 1. FIG. 5 is a cross-sectional view taken along the line V-V of FIG. 3. FIG. 6 is a plan view of the flow passage forming substrate 26 and the filter F1 viewed toward the Z2 side.

As illustrated in FIG. 5, the common flow passage BA1, in which the filter F1 is provided, has a lower wall surface WT, which is the Z1-side wall surface of the common flow passage BA1 among a plurality of wall surfaces of the common flow passage BA1 and is formed of the communication plate 22, an upper wall surface WJ, which is the Z2-side wall surface of the common flow passage BA1 among the plurality of wall surfaces of the common flow passage BA1 and is formed of the flow passage forming substrate 26, a wall surface WS1, which is the Y2-side wall surface of the common flow passage BA1 among the plurality of wall surfaces of the common flow passage BA1 and is formed of the communication plate 22 and the pressure compartment substrate 23, and a wall surface WS2, which is the Y1-side wall surface of the common flow passage BA1 among the plurality of wall surfaces of the common flow passage BA1 and is formed of the communication plate 22 and the pressure compartment substrate 23.

As illustrated in FIGS. 4 to 6, the filter F1 includes a plurality of protruding portions FT arranged in the Y-axis direction. In the present embodiment, as an example, it is assumed that the protruding portion FT is a structural object fixed to the upper wall surface WJ and having a shape of a rectangular parallelepiped. However, the protruding portion FT may have any shape other than a rectangular parallelepiped. For example, the protruding portion FT may have a shape of a round column or a shape of an elliptical column. The filter F1 comprised of the plurality of protruding portions FT arranged in the Y-axis direction catches an air bubble present in ink by means of two protruding portions FT located next to each other in the Y-axis direction. In the description below, a portion that is a part of the protruding portion FT and is joined to the upper wall surface WJ will be referred to as "base portion FK", and a portion that is a part of the protruding portion FT and is an end in the Z1 direction will be referred to as "head end portion FS".

In the present embodiment, the upper wall surface WJ, on which the plurality of protruding portions FT is provided, is an example of a "first wall surface", and the lower wall surface WT, which faces the upper wall surface WJ, is an example of a "second wall surface". In the present embodiment, a direction from the base portion FK toward the head end portion FS is an example of a "protruding direction". That is, in the present embodiment, the Z1 direction is the "protruding direction".

In the present embodiment, the protruding portions FT are formed of the pressure compartment substrate 23. In the present embodiment, the width of the protruding portion FT in the Z-axis direction is the same as the width of the pressure compartment substrate 23 in the Z-axis direction. In the description below, the width of the pressure compartment substrate 23 in the Z-axis direction will be referred to as "width LZ", and the width of the communication plate 22 in the Z-axis direction will be referred to as "width LR". That is, in the present embodiment, the width of the protruding portion FT in the Z-axis direction is the width LZ, and the width from the head end portion FS to the lower wall surface WT in the Z-axis direction is the width LR.

In the description below, a portion that is a part of the common flow passage BA1 and whose distance from the upper wall surface WJ in the Z-axis direction is not greater than the width LZ will be referred to as “filter-provided portion RF”. That is, the filter-provided portion RF is, of the common flow passage BA1, a portion where the filter F1 is provided. In addition, in the description below, a portion that is a part of the common flow passage BA1 and whose distance from the lower wall surface WT in the Z-axis direction is not greater than the width LR will be referred to as “ink-passing portion RR”. That is, the ink-passing portion RR is, of the common flow passage BA1, a portion where the filter F1 is not provided.

In the present embodiment, since the ink-passing portion RR is the portion where the filter F1 does not exist, it has a lower flow-passage resistance than the filter-provided portion RF, which is the portion where the filter F1 is formed. Therefore, with the present embodiment, it is possible to make the flow-passage resistance of the common flow passage BA1 lower than that of a configuration in which the ink-passing portion RR is not provided in the common flow passage BA1 and in which, therefore, the whole of the common flow passage BA1 is the filter-provided portion RF; accordingly, with the present embodiment, it is possible to supply ink from the common flow passage BA1 to the individual flow passages RK smoothly.

Moreover, in the present embodiment, the filter-provided portion RF is provided at a Z2-side position with respect to the ink-passing portion RR. An air bubble contained in ink flowing inside the common flow passage BA1 goes up in the Z2 direction due to buoyancy. For this reason, with the present embodiment, it is possible to catch an air bubble coming toward the liquid surface in the Z2 direction inside the common flow passage BA1 by using the filter F1 provided at the filter-provided portion RF.

As illustrated in FIGS. 5 and 6, in the description below, the width of the protruding portion FT in the X-axis direction will be referred to as “width LX”, and the width of the protruding portion FT in the Y-axis direction will be referred to as “width LY”. In addition, in the description below, the interval between two protruding portions FT located next to each other in the Y-axis direction, among the plurality of protruding portions FT arranged in the Y-axis direction, will be referred to as “interval LW”. In the present embodiment, the protruding portion FT that is one of two protruding portions FT located next to each other in the Y-axis direction is an example of a “first protruding portion”, and the other FT is an example of a “second protruding portion”. In addition, in the description below, the minimum value of the widths of the individual flow passages RK in the Y-axis direction will be referred to as “width LK”.

In the present embodiment, the plural protruding portions FT arranged in the Y-axis direction are located at substantially the same position in the X-axis direction in relation to one another. The concept of “substantially the same” mentioned here includes not only a case of being perfectly the same but also a case of being able to be deemed as the same, with a margin of error taken into consideration. In the present embodiment, the concept of “substantially the same” includes a case of being able to be deemed as the same, with a margin of error of 10% or so taken into consideration. That is, in the present embodiment, the existence range, in the X-axis direction, of the protruding portion FT that is one of two protruding portions FT located next to each other in the Y-axis direction is substantially the same as the existence range, in the X-axis direction, of the other FT. However, the scope of the present disclosure is not limited to this exemplary configuration. It is sufficient as long as the plurality of protruding portions FT arranged in the Y-axis direction is provided in such a manner that a part of the existence range, in the X-axis direction, of the protruding portion FT that is one of two protruding portions FT located next to each other in the Y-axis direction overlaps with a part of the existence range, in the X-axis direction, of the other FT.

As described above, the filter F1 comprised of the plurality of protruding portions FT arranged in the Y-axis direction catches an air bubble present in ink by means of two protruding portions FT located next to each other in the Y-axis direction. Therefore, the interval LW is set to have an interval value at which it is possible to catch an air bubble present in ink.

Specifically, in the present embodiment, the interval LW is set to be less than the width LZ. Therefore, with the present embodiment, it is possible to make the air-bubble catching capability of the filter F1 higher than that of a configuration in which the interval LW is greater than the width LZ.

In addition, in the present embodiment, the interval LW is set to be less than the width LK. Therefore, with the present embodiment, it is possible to make the air-bubble catching capability of the filter F1 higher than that of a configuration in which the interval LW is greater than the width LK.

In addition, in the present embodiment, the interval LW is set to be less than the width LX. Therefore, with the present embodiment, it is possible to make the air-bubble catching capability of the filter F1 higher than that of a configuration in which the interval LW is greater than the width LX.

Moreover, in the present embodiment, the width of the ink-passing portion RR, through which ink flows, of the common flow passage BA1 in the Z-axis direction is set to be greater than the width of the filter-provided portion RF, at which the filter F1 is provided, thereof in the Z-axis direction. Specifically, in the present embodiment, the width LR is set to be greater than the width LZ. Therefore, with the present embodiment, it is possible to make the flow-passage resistance of the common flow passage BA1 lower than that of a configuration in which the width LR is set to be less than the width LZ; accordingly, with the present embodiment, it is possible to supply ink from the common flow passage BA1 to the individual flow passages RK smoothly.

Moreover, in the present embodiment, the protruding portion FT is configured to have a shape that suppresses an increase in flow-passage resistance caused by providing the filter F1 in the common flow passage BA1.

Specifically, in the present embodiment, the width LY is set to be less than the width LX. Therefore, with the present embodiment, it is possible to make the flow-passage resistance of the common flow passage BA1 lower than that of a configuration in which the width LY is set to be greater than the width LX.

In addition, in the present embodiment, the width LY is set to be less than the width LZ. Therefore, with the present embodiment, it is possible to make the flow-passage resistance of the common flow passage BA1 lower than that of a configuration in which the width LY is set to be greater than the width LZ.

In addition, in the present embodiment, the width LY is set to be less than the interval LW. Therefore, with the present embodiment, it is possible to make the flow-passage resistance of the common flow passage BA1 lower than that of a configuration in which the width LY is set to be greater than the interval LW.

As illustrated in FIG. 6, in the present embodiment, the upper wall surface WJ includes an area AA, an area AB, and an area AC.

The area AB is an area which is located between an X2-side end EP1 of the upper wall surface WJ and the M-number of connection flow passages BR1 and at which the plurality of protruding portions FT making up the filter F1 is formed. As described above, the width of the area AB in the X-axis direction is the width LX.

The area AA is an area which is located between the end EP1 and the area AB and has a flat shape. In the description below, the width of the area AA in the X-axis direction will be referred to as "width LA". In the present embodiment, the width LA is set to be greater than the width LZ. Therefore, with the present embodiment, it is possible to make the length of time during which an air bubble present in ink flowing at a portion, of the common flow passage BA1, corresponding to the area AA in the X1 direction goes up in the Z2 direction greater than that of a configuration in which the width LA is set to be less than the width LZ. That is, with the present embodiment, it is possible to make the possibility that an air bubble present in ink will be caught by the filter F1 higher than that of a configuration in which the width LA is set to be less than the width LZ.

In the present embodiment, the area AA is an example of a "first area", and the area AB is an example of a "second area".

The area AC is an area which is located between the area AB and the connection flow passages BR1 and at which the vibration absorption plate CP1 is provided. In the present embodiment, the vibration absorption plate CP1 is provided at the area AC located between the area AB, at which the filter F1 is provided, and the connection flow passages BR1; therefore, as compared with a configuration in the vibration absorption plate CP1 is not provided at the area AC, it is possible to reduce an influence, on the characteristics of ejecting ink from the nozzles N that are in communication with the individual flow passages RK including the connection flow passages BR1, of changes in ink pressure caused due to turbulence in ink flow arising from passing through the filter F1.

As described above, with the present embodiment, since the filter F1 comprised of the plurality of protruding portions FT having such a size that their head end is not in contact with the lower wall surface WT is provided in the common flow passage BA1, it is possible to catch an air bubble present in ink flowing through the common flow passage BA1 while suppressing an excessive increase in flow-passage resistance of the common flow passage BA1.

Though the filter F1 provided in the common flow passage BA1 has been taken as an example in the above description, similarly to the filter F1, the filter F2 provided in the common flow passage BA2 is also comprised of a plurality of protruding portions FT. More specifically, the filter F2 may have the same structure as that of the filter F1 illustrated in FIGS. 4 to 6.

4. Conclusion of Embodiment

As described above, the liquid ejecting head 1 according to the present embodiment includes the M-number of individual flow passages RK provided correspondingly to the M-number of nozzles N from which ink is ejected; the common flow passage BA1 that is in shared communication with the M-number of individual flow passages RK and supplies ink to the M-number of individual flow passages RK; and the common flow passage BA2 that is in shared communication with the M-number of individual flow passages RK and collects ink from the M-number of individual flow passages RK, wherein the filter F1 comprised of the plurality of protruding portions FT provided such that their head end is not in contact with a plurality of wall surfaces of the common flow passage BA1 is provided in the common flow passage BA1.

The liquid ejecting head 1 according to the present embodiment includes the M-number of individual flow passages RK provided correspondingly to the M-number of nozzles N from which ink is ejected; and the common flow passage BA1 that is in shared communication with the M-number of individual flow passages RK and supplies ink to the M-number of individual flow passages RK, wherein the filter F1 comprised of the plurality of protruding portions FT protruding from the upper wall surface WJ among a plurality of wall surfaces of the common flow passage BA1 is provided in the common flow passage BA1, and the plurality of protruding portions FT is not in contact with any of the plurality of wall surfaces of the common flow passage BA1, except for the upper wall surface WJ.

That is, according to the present embodiment, the head end of the protruding portions FT making up the filter F1 is not in contact with the wall surfaces of the common flow passage BA1; therefore, for example, as compared with a configuration in which the head end of the protruding portions FT making up the filter F1 is in contact with the wall surfaces of the common flow passage BA1 and in which the filter F1 is provided throughout the entire cross section of the common flow passage BA1, it is possible to suppress the flow-passage resistance of the common flow passage BA1. Because of this lower flow-passage resistance, the present embodiment makes it possible to supply ink from the common flow passage BA1 to the individual flow passages RK smoothly.

The liquid ejecting head 1 according to the present embodiment further includes the pressure compartment substrate 23 in which the pressure compartments CV that apply pressure to ink are formed, the nozzle substrate 21 in which the M-number of nozzles N are formed, and the communication plate 22 provided between the pressure compartment substrate 23 and the nozzle substrate 21, wherein the common flow passage BA1 has the upper wall surface WJ on which the plurality of protruding portions FT is provided and the lower wall surface WT facing the upper wall surface WJ and formed of the communication plate 22, and the plurality of protruding portions FT is provided in such a way as not to be in contact with the lower wall surface WT.

Therefore, with the present embodiment, it is possible to make the flow-passage resistance of the common flow passage BA1 lower than that of a configuration in which the plurality of protruding portions FT is provided in such a way as to be in contact with the lower wall surface WT.

In the liquid ejecting head 1 according to the present embodiment, the plurality of protruding portions FT is formed of the pressure compartment substrate 23.

Therefore, with the present embodiment, for example, it is possible to form the plurality of protruding portions FT and pressure compartments CV in the same process, and, as compared with when the plurality of protruding portions FT and pressure compartments CV are formed in separate processes, it is possible to reduce the manufacturing cost of the liquid ejecting head 1.

In the liquid ejecting head 1 according to the present embodiment, the M-number of individual flow passages RK are arranged in the Y1 direction, the common flow passage BA2 is located in the X1 direction intersecting with the Y1 direction as viewed from the common flow passage BA1, the plurality of protruding portions FT includes two protruding portions FT located next to each other in the Y1 direction, and a part or a whole of an existence range in the X1 direction of one FT of the two protruding portions FT overlaps with a part or a whole of an existence range in the X1 direction of the other FT thereof.

Therefore, with the present embodiment, for example, it is possible to catch an air bubble by means of the two protruding portions FT located next to each other in the Y1 direction.

In the liquid ejecting head 1 according to the present embodiment, the nozzles N eject ink in the Z1 direction, and the interval LW in the Y1 direction between two protruding portions FT located next to each other in the Y1 direction is less than the width LZ of the protruding portions FT in the Z1 direction.

Therefore, with the present embodiment, it is possible to make the air-bubble catching capability of the two protruding portions FT located next to each other in the Y1 direction higher than that of a configuration in which the interval LW is greater than the width LZ.

In the liquid ejecting head 1 according to the present embodiment, the interval LW in the Y1 direction between two protruding portions FT located next to each other in the Y1 direction is less than the width LK of the individual flow passage RK in the Y1 direction.

Therefore, with the present embodiment, it is possible to make the air-bubble catching capability of the two protruding portions FT located next to each other in the Y1 direction higher than that of a configuration in which the interval LW is greater than the width LK.

In the liquid ejecting head 1 according to the present embodiment, the individual flow passages RK include the pressure compartments CV that apply pressure to ink, and the vibration absorption plate CP1 that absorbs ink vibration generated in the pressure compartments CV is provided in the common flow passage BA1.

Therefore, with the present embodiment, it is possible to reduce an influence caused by ink vibration on the characteristics of ejecting ink from the nozzles N and thus enhance the quality of an image formed by the liquid ejecting head 1.

In the liquid ejecting head 1 according to the present embodiment, the M-number of individual flow passages RK are arranged in the Y1 direction, the common flow passage BA2 is located in the X1 direction intersecting with the Y1 direction as viewed from the common flow passage BA1, and the vibration absorption plate CP1 is provided between the filter F1 and the individual flow passages RK in the X1 direction.

Therefore, with the present embodiment, it is possible to reduce an influence, on the characteristics of ejecting ink from the nozzles N that are in communication with the individual flow passages RK, of changes in ink pressure caused due to turbulence in ink flow arising from passing through the filter F1.

The liquid ejecting head 1 according to the present embodiment further includes the diaphragm 24 that includes the vibration plate CPZ that changes pressure inside the pressure compartment CV by being driven to vibrate by the piezoelectric element PZ provided at the position corresponding to the pressure compartment CV, and the vibration absorption plate CP1 is formed of the diaphragm 24.

Therefore, with the present embodiment, for example, it is possible to form the vibration plate CPZ and the vibration absorption plate CP1 in the same process, and, as compared with when the vibration plate CPZ and the vibration absorption plate CP1 are formed in separate processes, it is possible to reduce the manufacturing cost of the liquid ejecting head 1.

In the liquid ejecting head 1 according to the present embodiment, the width LX of the protruding portion FT in the X1 direction is greater than the interval LW in the Y1 direction between two protruding portions FT located next to each other in the Y1 direction.

Therefore, with the present embodiment, it is possible to make the air-bubble catching capability of the two protruding portions FT located next to each other in the Y1 direction higher than that of a configuration in which the interval LW is greater than the width LX.

In the liquid ejecting head 1 according to the present embodiment, the common flow passage BA1 includes the upper wall surface WJ, on which the plurality of protruding portions FT is provided, and the lower wall surface WT, which faces the upper wall surface WJ, and the width LZ of the protruding portion FT in the protruding direction from the base portion FK, at which the upper wall surface WJ and the protruding portion FT are joined to each other, toward the head end portion FS of the protruding portion FT is less than the width LR of the ink-passing portion RR between the head end portion FS of the protruding portion FT and the lower wall surface WT.

Therefore, with the present embodiment, it is possible to make the flow-passage resistance of the common flow passage BA1 lower than that of a configuration in which the width LZ is set to be greater than the width LR; accordingly, with the present embodiment, it is possible to supply ink from the common flow passage BA1 to the individual flow passages RK smoothly.

In the liquid ejecting head 1 according to the present embodiment, the M-number of individual flow passages RK are arranged in the Y1 direction, the common flow passage BA2 is located in the X1 direction as viewed from the common flow passage BA1, the nozzles N eject ink in the Z1 direction, the common flow passage BA1 includes the upper wall surface WJ that has the area AA and the area AB, which is located between the area AA and the M-number of individual flow passages RK in the X1 direction and at which the plurality of protruding portions FT is provided, and the width LA of the area AA in the X1 direction is greater than the width LZ of the protruding portion FT in the Z1 direction.

Therefore, with the present embodiment, it is possible to make the length of time during which an air bubble present in ink flowing through the common flow passage BA1 goes up due to buoyancy greater than that of a configuration in which width LA is less than the width LZ, and it is thus possible to increase the possibility that the air bubble present in the ink flowing through the common flow passage BA1 will be caught by the filter F1.

The liquid ejecting head 1 according to the present embodiment includes the M-number of individual flow passages RK provided correspondingly to the M-number of nozzles N from which ink is ejected; the common flow passage BA1 that is in shared communication with the M-number of individual flow passages RK and supplies ink to the M-number of individual flow passages RK; and the common flow passage BA2 that is in shared communication with the M-number of individual flow passages RK and collects ink from the M-number of individual flow passages RK, wherein the filter F2 comprised of the plurality of protruding portions FT provided such that their head end is not in contact with a plurality of wall surfaces of the common flow passage BA2 is provided in the common flow passage BA2.

That is, according to the present embodiment, the head end of the protruding portions FT making up the filter F2 is not in contact with the wall surfaces of the common flow passage BA2; therefore, for example, as compared with a configuration in which the head end of the protruding portions FT making up the filter F2 is in contact with the wall surfaces of the common flow passage BA2 and in which the filter F2 is provided throughout the entire cross section of the common flow passage BA2, it is possible to suppress the flow-passage resistance of the common flow passage BA2. Because of this lower flow-passage resistance, the present embodiment makes it possible to collect ink from the individual flow passages RK to the common flow passage BA2 smoothly.

B. MODIFICATION EXAMPLES

The embodiment described as examples above can be modified in various ways. Some specific examples of modification are described below. Two or more modification examples selected arbitrarily from the description below may be combined as long as they are not contradictory to each other or one another.

First Modification Example

In the embodiment described above, a case where the width LR of the ink-passing portion RR in the Z-axis direction is greater than the width LZ of the filter-provided portion RF in the Z-axis direction has been taken as an example. However, the scope of the present disclosure is not limited to this exemplary configuration. For example, the width LZ may be set to be greater than the width LR.

That is, in the liquid ejecting head 1 according to this modification example, the common flow passage BA1 includes the upper wall surface WJ, on which the plurality of protruding portions FT is provided, and the lower wall surface WT, which faces the upper wall surface WJ, and the width LZ of the protruding portion FT in the protruding direction from the base portion FK, at which the upper wall surface WJ and the protruding portion FT are joined to each other, toward the head end portion FS of the protruding portion FT is greater than the width LR of the ink-passing portion RR between the head end portion FS of the protruding portion FT and the lower wall surface WT.

Therefore, with this modification example, it is possible to catch an air bubble present in ink more reliably than in a configuration in which the width LZ is set to be less than the width LR.

Second Modification Example

In the embodiment and the first modification example described above, a case where the width LY of the protruding portion FT in the Y-axis direction is less than the interval LW between two protruding portions FT located next to each other in the Y-axis direction has been taken as an example. However, the scope of the present disclosure is not limited to this exemplary configuration. For example, the width LY may be set to be greater than the interval LW.

Third Modification Example

In the embodiment and the first and second modification examples described above, a configuration in which the vibration absorption plate CP1 is provided between the filter F1 and the individual flow passages RK in the X-axis direction has been taken as an example. However, the scope of the present disclosure is not limited to this exemplary configuration. For example, the filter F1 may be provided between the vibration absorption plate CP1 and the individual flow passages RK. Similarly, the filter F2 may be provided between the vibration absorption plate CP2 and the individual flow passages RK.

Fourth Modification Example

In the embodiment and the first to third modification examples described above, a case where the lower wall surface WT of the common flow passage BA1 is formed of the communication plate 22 has been taken as an example. However, the scope of the present disclosure is not limited to this exemplary configuration. The lower wall surface WT of the common flow passage BA1 may be formed of the nozzle substrate 21. Similarly, the Z1-side lower wall surface of the common flow passage BA2 may be formed of the nozzle substrate 21.

The lower wall surface WT of the common flow passage BA1 may be formed of a compliance sheet. The term "compliance sheet" mentioned here means a plate-like member that has longer sides in the Y-axis direction and is made of an elastic material. The compliance sheet absorbs the pressure of ink inside the common flow passage BA1. When the lower wall surface WT of the common flow passage BA1 is formed of a compliance sheet, the vibration absorption plate CP1 may be omitted from the liquid ejecting head 1.

Similarly, the Z1-side lower wall surface of the common flow passage BA2 may be formed of a compliance sheet. In this case, the vibration absorption plate CP2 may be omitted from the liquid ejecting head 1.

Fifth Modification Example

In the embodiment and the first to fourth modification examples described above, a configuration in which the plurality of protruding portions FT is provided in such a manner that the interval between two protruding portions FT located next to each other in the Y-axis direction is the interval LW has been taken as an example. However, the scope of the present disclosure is not limited to this exemplary configuration. The plurality of protruding portions FT may be provided in such a manner that, among the plurality of protruding portions FT arranged in the Y-axis direction, the interval between one protruding portion FT and a protruding portion FT located next to this one protruding portion FT is different from the interval between another protruding portion FT and a protruding portion FT located next to this another protruding portion FT.

Figure 7:
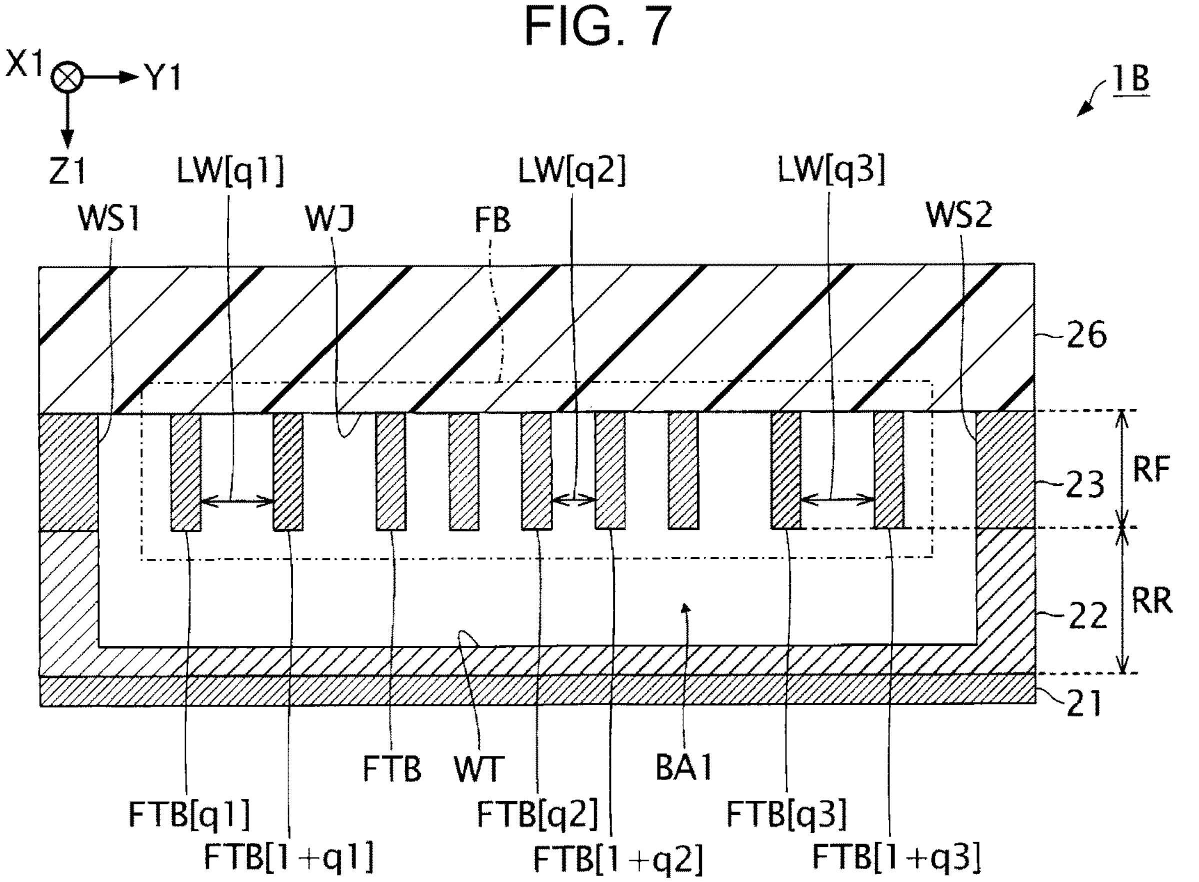
FIG. 7 is a cross-sectional view illustrating an example of the configuration of the common flow passage (BA1) and a filter (FB) according to a fifth modification example.

FIG. 7 is a cross-sectional view of a liquid ejecting head 1B according to this modification example.

As illustrated in FIG. 7, the liquid ejecting head 1B is different from the liquid ejecting head 1 according to the foregoing embodiment in that it includes a filter FB in place of the filter F. The filter FB is different from the filter F according to the foregoing embodiment in that it includes a plurality of protruding portions FTB in place of the plurality of protruding portions FT.

In FIG. 7, a case where the filter FB includes Q-number of protruding portions FTB arranged in the Y1 direction is assumed. The value Q mentioned here is a natural number that satisfies "$Q \geq 6$". In the description below, among the Q-number of protruding portions FTB arranged in the Y1 direction, the q-th protruding portion FTB will be referred to as "protruding portion FTB[q]". In this definition, the variable number q is a natural number that satisfies "$1 \leq q \leq Q$".

In addition, in the description below, a variable q1, a variable q2, and a variable q3, which are natural numbers that satisfy "1≤q1<q2<q3<Q", are introduced. A protruding portion FTB[q1] is located closer to the wall surface WS1 than a protruding portion FTB[q2] is. A protruding portion FTB[q3] is located closer to the wall surface WS2 than the protruding portion FTB[q2] is. In addition, the protruding portion FTB[q2] is located closer to the center of the common flow passage BA1 in the Y-axis direction than the protruding portion FTB[q2] and the protruding portion FTB [q3] are. In addition, in the description below, the interval in the Y-axis direction between the protruding portion FTB[q1] and a protruding portion FTB[1+q1], which is located next to the protruding portion FTB[q1] on the Y1 side with respect to the protruding portion FTB[q1], will be referred to as "interval LW[q1]", the interval in the Y-axis direction between the protruding portion FTB[q2] and a protruding portion FTB[1+q2], which is located next to the protruding portion FTB[q2] on the Y1 side with respect to the protruding portion FTB[q2], will be referred to as "interval LW[q2]", and the interval in the Y-axis direction between the protruding portion FTB[q3] and a protruding portion FTB [1+q3], which is located next to the protruding portion FTB[q3] on the Y1 side with respect to the protruding portion FTB[q3], will be referred to as "interval LW[q3]".

In this modification example, the protruding portions FTB, the number of which is Q, are provided in such a manner that the interval LW[q] between two protruding portions FTB located next to each other in the Y-axis direction is relatively narrow at a center portion of the common flow passage BA1 in the Y-axis direction and that the interval LW[q] between two protruding portions FTB located next to each other in the Y-axis direction is relatively wide at end portions of the common flow passage BA1 in the Y-axis direction. Specifically, in this modification example, the Q-number of protruding portions FTB are provided in such a manner that the interval LW[q1] and the interval LW[q2] satisfy a relation of "LW[q1]>LW[q2]" and that the interval LW[q2] and the interval LW[q3] satisfy a relation of "LW[q3]>LW[q2]".

That is, in the liquid ejecting head 1B according to this modification example, the Q-number of protruding portions FTB include the protruding portion FTB[q1] and the protruding portion FTB[1+q1] that are located next to each other in the Y1 direction and the protruding portion FTB[q2] and the protruding portion FTB[1+q2] that are located next to each other in the Y1 direction, the protruding portion FTB[q1] and the protruding portion FTB[1+q1] are provided at positions closer to an end of the Q-number of protruding portions FTB than the protruding portion FTB[q2] and the protruding portion FTB[1+q2] are, and the interval between the protruding portion FTB[q1] and the protruding portion FTB[1+q1] in the Y1 direction is wider than the interval between the protruding portion FTB[q2] and the protruding portion FTB[1+q2] in the Y1 direction. In this modification example, the protruding portion FTB[q2] is an example of a "first protruding portion", the protruding portion FTB[1+q2] is an example of a "second protruding portion", the protruding portion FTB[q1] is an example of a "third protruding portion", and the protruding portion FTB[1+q1] is an example of a "fourth protruding portion".

Therefore, with this modification example, when ink present inside the liquid ejecting head 1B is let out by sucking the ink present inside the liquid ejecting head 1B or by applying pressure thereto, even in a case where the pressure applied to the ink at the end portions of the filter FB in the Y-axis direction is lower than the pressure applied to the ink at the center portion of the filter FB in the Y-axis direction, it is possible to let the ink at the end portions of the filter FB in the Y-axis direction out smoothly.

Sixth Modification Example

In the embodiment and the first to fifth modification examples described above, a case where the filter F or the filter FB is comprised of the plurality of protruding portions FT arranged in a single row in the Y-axis direction or the plurality of protruding portions FTB arranged in a single row in the Y-axis direction has been taken as an example. However, the scope of the present disclosure is not limited to this exemplary configuration. In the filter F, the plurality of protruding portions FT may be arranged to form a plurality of rows each extending in the Y-axis direction.

Figure 8:
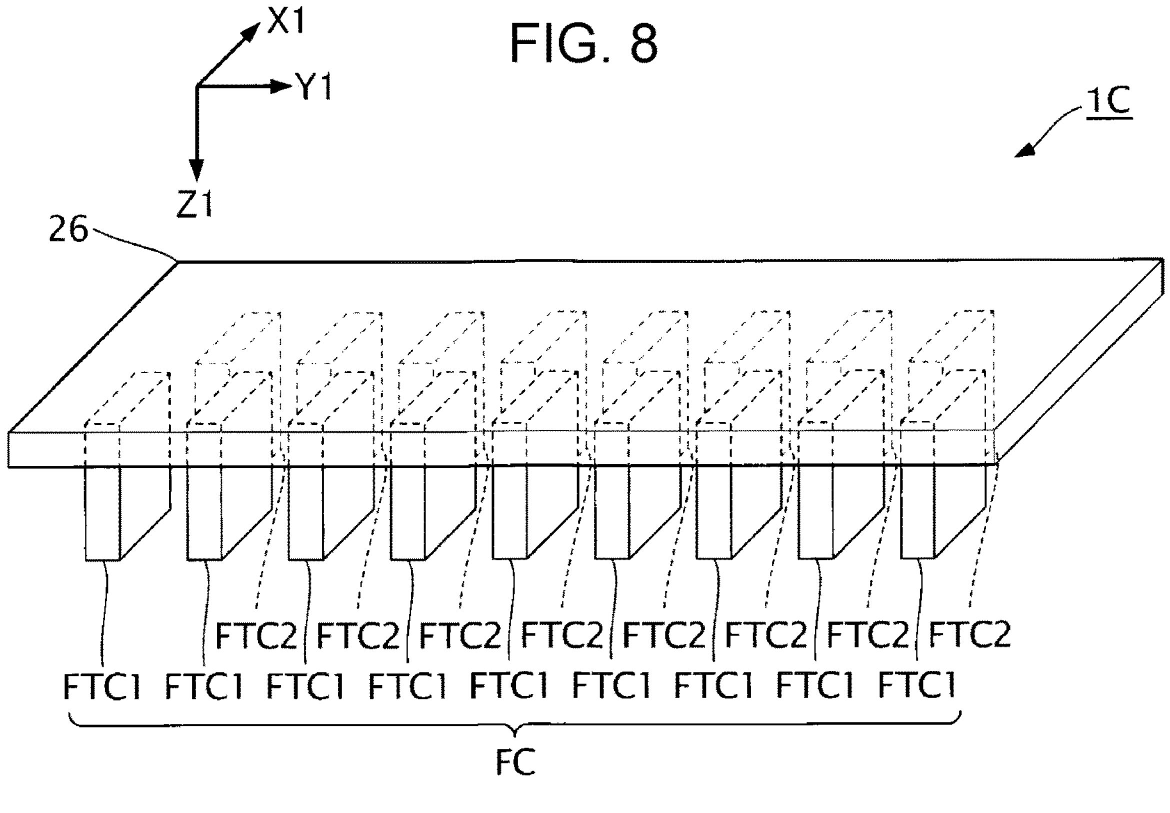
FIG. 8 is a perspective view illustrating an example of the configuration of the flow passage forming substrate and a filter (FC) according to a sixth modification example.

FIG. 8 is a perspective view of the flow passage forming substrate 26 and a filter FC of a liquid ejecting head 1C according to this modification example.

As illustrated in FIG. 8, the liquid ejecting head 1C is different from the liquid ejecting head 1 according to the foregoing embodiment in that it includes a filter FC in place of the filter F. The filter FC is different from the filter F according to the foregoing embodiment in that it includes, in place of the plurality of protruding portions FT arranged in the Y-axis direction, a plurality of protruding portions FTC1 arranged in the Y-axis direction and, on the X1 side with respect to the plurality of protruding portions FTC1, a plurality of protruding portions FTC2 arranged in the Y-axis direction.

Figure 9:
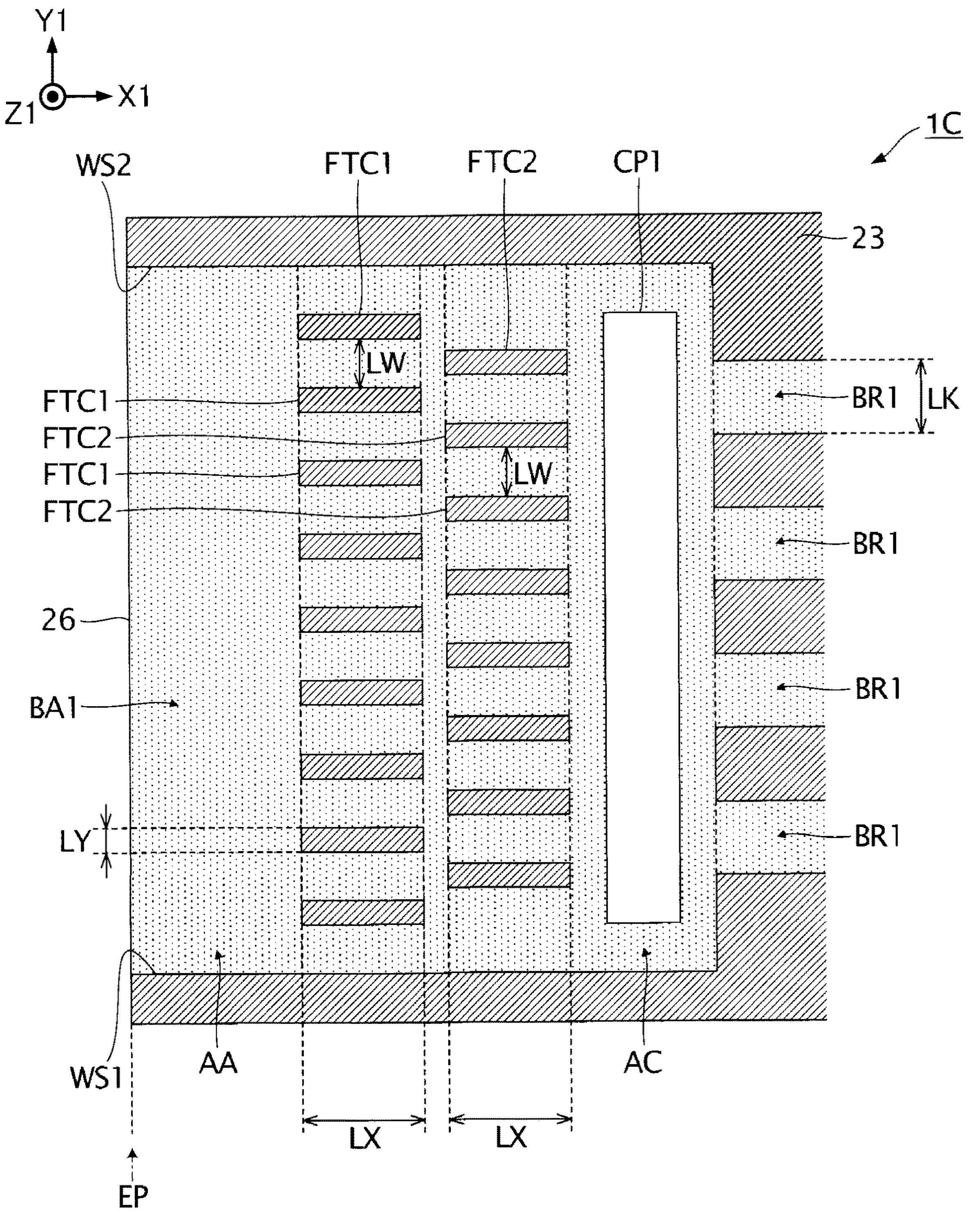
FIG. 9 is a plan view illustrating an example of the configuration of the common flow passage (BA1) and the filter (FC) according to the sixth modification example.

FIG. 9 is a plan view of the flow passage forming substrate 26 and the filter FC viewed toward the Z2 side.

As illustrated in FIG. 9, in this modification example, the filter FC includes the plurality of protruding portions FTC1, which is provided in such a way as to form a row in the Y-axis direction, between the area AA and the area AC of the upper wall surface WJ, and the plurality of protruding portions FTC2, which is provided in such a way as to form a row in the Y-axis direction, between the plurality of protruding portions FTC1 and the area AC of the upper wall surface WJ. In addition, in this modification example, the filter FC is provided in such a manner that the interval between two protruding portions FTC1 located next to each other in the Y-axis direction is the interval LW and that the interval between two protruding portions FTC2 located next to each other in the Y-axis direction is the interval LW. Moreover, in this modification example, one protruding portion FTC2 is located at a position that lies between, in the Y-axis direction, two protruding portions FTC1 located next to each other.

As described above, in the liquid ejecting head 1C according to this modification example, the filter FC includes the plurality of protruding portions FTC1 and the plurality of protruding portions FTC2, and, among the plurality of protruding portions FTC2, one protruding portion FTC2 is provided at a position that lies between two protruding portions FTC1 located next to each other in the Y1 direction and is different from positions of the two protruding portions FTC1 in the X1 direction. In this modification example, the protruding portion FTC1 that is one of two protruding portions FTC1 located next to each other in the Y-axis direction is an example of a "first protruding portion", and the other FTC1 is an example of a "second protruding portion". In addition, in this modification example, the protruding portion FTC2 located at a position that lies between two protruding portions FTC1 located next to each other in the Y1 direction is an example of a "third protruding portion".

That is, with this modification example, since the protruding portion FTC2 is provided at a position that lies between two protruding portions FTC1 located next to each other in the Y1 direction, it is possible to make the air-bubble catching capability of the filter FC higher than that of a configuration in which such a protruding portion FTC2 is not provided.

Seventh Modification Example

In the embodiment and the first to sixth modification examples described above, a case where the common flow passage R2 is provided and where ink that was not ejected from the nozzles N is sent to the common flow passage R2 and is then collected to the ink supply device 8 has been taken as an example. However, the scope of the present disclosure is not limited to this exemplary configuration. The common flow passage R2 may be omitted, and almost all of ink having been supplied to the common flow passage R1 may be ejected from the nozzles N.

Eighth Modification Example

In the embodiment and the first to seventh modification examples described above, a serial-type liquid ejecting apparatus 100 that reciprocates, in the X-axis direction, the housing case 921 in which liquid ejecting heads are mounted has been taken as an example. However, the scope of the present disclosure is not limited to this exemplary configuration. The liquid ejecting apparatus 100 may be a so-called line-type liquid ejecting apparatus in which the plural nozzles N are arranged throughout the entire width of the medium PP.

Ninth Modification Example

The liquid ejecting apparatus according to the embodiment and the first to eighth modification examples described above can be applied to various kinds of equipment such as facsimiles and copiers, etc. in addition to print-only machines. The scope of application and use of the liquid ejecting apparatus according to the present disclosure is not limited to printing. For example, a liquid ejecting apparatus that ejects a colorant solution can be used as an apparatus for manufacturing a color filter of a liquid crystal display device. A liquid ejecting apparatus that ejects a solution of a conductive material can be used as a manufacturing apparatus for forming wiring lines and electrodes of a wiring substrate.

What is claimed is:

1. A liquid ejecting head, comprising:

a plurality of individual flow passages provided correspondingly to a plurality of nozzles from which a liquid is ejected; and a first common flow passage that is in shared communication with the plurality of individual flow passages and supplies a liquid to the plurality of individual flow passages;

a second common flow passage that is in shared communication with the plurality of individual flow passages and collects a liquid from the plurality of individual flow passages, wherein a filter comprised of a plurality of protruding portions protruding from a first wall surface among a plurality of wall surfaces of the first common flow passage is provided in the first common flow passage, and the plurality of protruding portions is not in contact with any of the plurality of wall surfaces of the first common flow passage, except for the first wall surface.

2. The liquid ejecting head according to claim 1, further comprising:

a pressure compartment substrate in which a pressure compartment that applies pressure to a liquid is formed;

a nozzle substrate in which the plurality of nozzles is formed; and a communication plate provided between the pressure compartment substrate and the nozzle substrate, wherein the first common flow passage has the first wall surface on which the plurality of protruding portions is provided, and a second wall surface facing the first wall surface and formed of the communication plate, and the plurality of protruding portions is provided in such a way as not to be in contact with the second wall surface.

3. The liquid ejecting head according to claim 2, wherein the plurality of protruding portions is formed of the pressure compartment substrate.

4. The liquid ejecting head according to claim 1, wherein the plurality of individual flow passages is arranged in a first direction, the second common flow passage is located in a second direction intersecting with the first direction as viewed from the first common flow passage, the plurality of protruding portions includes a first protruding portion and a second protruding portion that are located next to each other in the first direction, and a part or a whole of a range in which the first protruding portion exists in the second direction overlaps with a part or a whole of a range in which the second protruding portion exists in the second direction.

5. The liquid ejecting head according to claim 4, wherein the plurality of protruding portions further includes a third protruding portion provided at a position that lies between the first protruding portion and the second protruding portion in the first direction and is different from positions of the first protruding portion and the second protruding portion in the second direction.

6. The liquid ejecting head according to claim 4, wherein the nozzle ejects a liquid in a third direction intersecting with the first direction and with the second direction, and an interval between the first protruding portion and the second protruding portion in the first direction is less than a width of the first protruding portion in the third direction.

7. The liquid ejecting head according to claim 4, wherein an interval between the first protruding portion and the second protruding portion in the first direction is less than a width of the individual flow passage in the first direction.

8. The liquid ejecting head according to claim 4, wherein the plurality of protruding portions further includes a third protruding portion and a fourth protruding portion that are located next to each other in the first direction, the third protruding portion and the fourth protruding portion are provided at positions closer to an end of the plurality of protruding portions than the first protruding portion and the second protruding portion are, and an interval between the third protruding portion and the fourth protruding portion in the first direction is wider than an interval between the first protruding portion and the second protruding portion in the first direction.

9. The liquid ejecting head according to claim 4, wherein a width of the first protruding portion in the second direction is greater than an interval between the first protruding portion and the second protruding portion in the first direction.

10. The liquid ejecting head according to claim 1, wherein the individual flow passage includes a pressure compartment that applies pressure to a liquid, and a vibration absorber that absorbs liquid vibrations generated in the pressure compartment is provided in the first common flow passage.

11. The liquid ejecting head according to claim 10, wherein the plurality of individual flow passages is arranged in a first direction, the second common flow passage is located in a second direction intersecting with the first direction as viewed from the first common flow passage, and the vibration absorber is provided between the filter and the individual flow passage in the second direction.

12. The liquid ejecting head according to claim 10, further comprising:

a diaphragm that changes pressure inside the pressure compartment by being driven to vibrate by a piezoelectric element provided at a position corresponding to the pressure compartment, wherein the vibration absorber is formed of the diaphragm.

13. The liquid ejecting head according to claim 1, wherein the first common flow passage has the first wall surface on which the plurality of protruding portions is provided, and a second wall surface facing the first wall surface, and a width of the protruding portion in a protruding direction from a junction where the first wall surface and the protruding portion are joined to each other toward a head end of the protruding portion is greater than an interval between the head end of the protruding portion and the second wall surface.

14. The liquid ejecting head according to claim 1, wherein the first common flow passage has the first wall surface on which the plurality of protruding portions is provided, and a second wall surface facing the first wall surface, and a width of the protruding portion in a protruding direction from a junction where the first wall surface and the protruding portion are joined to each other toward a head end of the protruding portion is less than an interval between the head end of the protruding portion and the second wall surface.

15. The liquid ejecting head according to claim 1, wherein the plurality of individual flow passages is arranged in a first direction, the second common flow passage is located in a second direction intersecting with the first direction as viewed from the first common flow passage, the nozzle ejects a liquid in a third direction intersecting with the first direction and with the second direction, the first common flow passage includes the first wall surface that has a first area, and a second area which is located between the first area and the plurality of individual flow passages in the second direction and at which the plurality of protruding portions is provided, and a width of the first area in the second direction is greater than a width of the protruding portion in the third direction.

16. A liquid ejecting apparatus, comprising:

the liquid ejecting head according to claim 1; and a controller that controls liquid ejection from the liquid ejecting head.

17. A liquid ejecting head, comprising:

a plurality of individual flow passages provided correspondingly to a plurality of nozzles from which a liquid is ejected;

a first common flow passage that is in shared communication with the plurality of individual flow passages and supplies a liquid to the plurality of individual flow passages; and a second common flow passage that is in shared communication with the plurality of individual flow passages and collects a liquid from the plurality of individual flow passages, wherein a filter comprised of a plurality of protruding portions protruding from a first wall surface among a plurality of wall surfaces of the second common flow passage is provided in the second common flow passage, and the plurality of protruding portions is not in contact with any of the plurality of wall surfaces of the second common flow passage, except for the first wall surface.

* * * * *